Oct. 18, 1949.
S. R. BARR
2,485,349
COMBINED SHUTOFF AND METERING VALVE
Filed Nov. 24, 1945
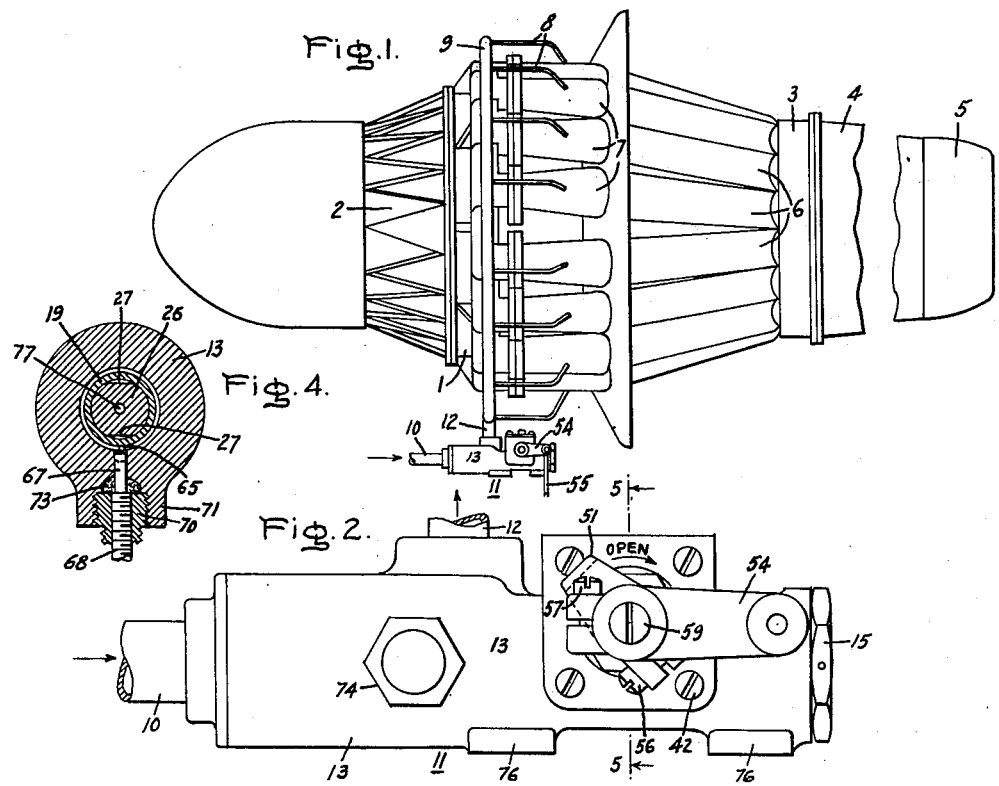
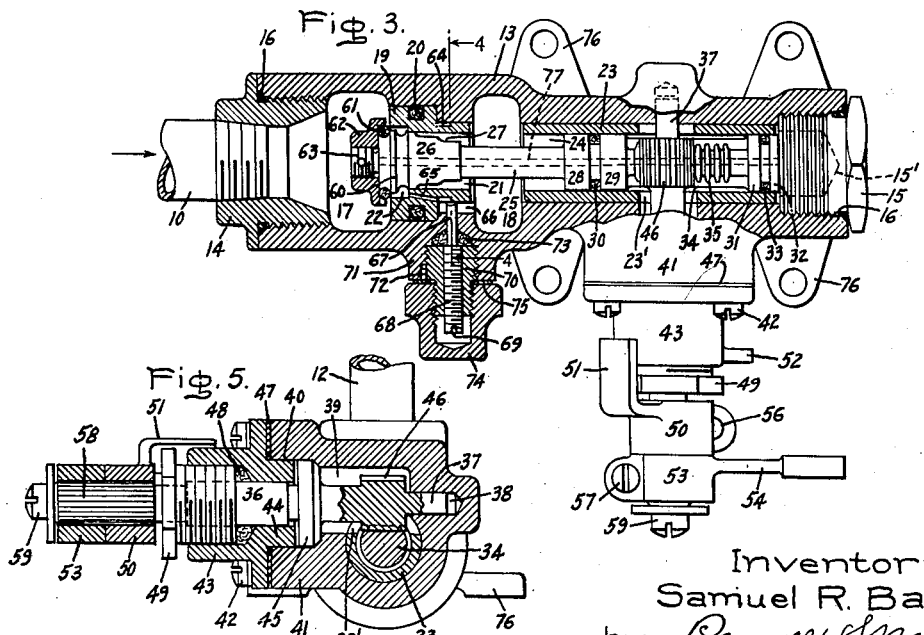
Inventor:
Samuel R. Barr,
by Powell S. Mack
His Attorney.

Patented Oct. 18, 1949

2,485,349

UNITED STATES PATENT OFFICE 2,485,349

COMBINED SHUTOFF AND METERING VALVE

Samuel R. Barr, Bridgeport, Conn., assignor to General Electric Company, a corporation of New York Application November 24, 1945, Serial No. 630,673

5 Claims. (Cl. 277—53)

My invention relates to a combined shut-off and metering valve for controlling the flow of fluids. It is particularly applicable to regulation of the flow of fluid fuel to the combustion chamber of a thermal powerplant, and is well adapted for use as a combined shut-off and throttle valve for a gas turbine powerplant. It has particular utility as a control valve for gas turbine powerplants for the jet propulsion of aircraft.

An object of the invention is to provide a new and improved combined shut-off and metering valve which is simple in construction, easy to test and adjust, has a minimum of weight and mechanical complexity, and is operated by a single lever with a minimum operating torque.

Other specific objects and advantages will be apparent from the specification and the claims appended hereto taken in connection with the accompanying drawing, in which Fig. 1 is a schematic outline of an aircraft gas turbine powerplant showing the application of my improved control valve; Fig. 2 is an enlarged view, in elevation, of the control valve shown in Fig. 1; Fig. 3 is a plan view of the control valve, partly in section, to the same scale as Fig. 2; Fig. 4 is a cross section taken on the plane 4—4 in Fig. 3; and Fig. 5 is a sectional view on the plane 5—5 in Fig. 2.

Fig. 1 represents diagrammatically a gas turbine powerplant for the jet propulsion of aircraft, including a housing 1 containing a compressor which receives air through an annular inlet grill 2, a turbine rotor contained within a housing 3 and arranged to discharge hot exhaust gases from the turbine through a conduit 4 to a suitable propulsion nozzle 5. Between the compressor casing and the turbine casing are arranged a plurality of combustion chambers or "combustors" 6, each of which is connected by an air adapter 7 to the discharge scroll of the compressor 1. Each air adapter is provided with a fuel spray nozzle (not shown). The respective nozzles are supplied with fluid fuel through a plurality of branch lines 8 connected to a common manifold 9. Fuel is supplied from a suitable source (not shown) through conduit 10 to the control valve 11, thence to conduit 12 which communicates with manifold 9.

Further details of the construction and arrangement of the gas turbine powerplant represented diagrammatically in Fig. 1 are not necessary to an understanding of the present invention, and are more specifically disclosed in application Serial No. 525,391, filed March 7, 1944, in the name of Dale D. Streid, now Patent Number 2,432,359, issued December 9, 1947, and assigned to the same assignee as the present application. It will be understood that this control valve is equally applicable to other thermal powerplants, such as those disclosed in applications Serial Nos. 506,930, filed October 20, 1943, since abandoned and 541,565, filed June 22, 1944, in the name of Alan Howard, and assigned to the same assignee as the present application.

As will be seen from Figs. 2 and 3, this control valve comprises a body 13 having a longitudinal bore extending all the way through and being closed by a threaded plug 14 at one end and a second threaded plug 15 at the other end. Plug 14 is provided with any suitable means for securing the inlet conduit 10, while the plug 15 is imperforate. Each may be provided with any type of suitable gasket 16 to prevent leakage through the threads.

Formed in valve body 13 intermediate the ends is a first chamber 17 and a second axially spaced chamber 18. Pressed into position between chamber 17 and chamber 18 is a first bushing 19 having a suitable packing ring 20 located in an annular groove in the outer circumference of the bushing in such a manner as to prevent leakage between the bushing and the housing. This bushing also has an axial bore 21 communicating with an enlarged bore end portion 22.

A second separate bushing 23 is pressed into the axial bore of the housing 13 between chamber 18 and the plug 15. Bushing 23 is likewise provided with an axial bore 24, of constant diameter.

Arranged to slide longitudinally in the bore of the respective bushings 19 and 23 is a spindle 25 having a number of separate axially spaced portions. Adjacent the left end of the spindle, as shown in Fig. 3, is an enlarged cylindrical metering body 26 arranged to slide axially with a close fit in bushing 19, and having two diametrically opposite contoured "flat" portions 27 arranged to serve a purpose which will appear hereinafter. Cooperating with the second bushing 23 is an intermediate enlarged portion comprising cylinders 28 and 29 defining an annular groove containing a suitable packing ring 30. Cooperating with the extreme end portion of bushing 23 is a third enlarged portion comprising cylinders 31 and 32 defining an annular groove containing a packing ring 33. Arranged between cylinders 29 and 31 is a spindle portion 34 having machined on one side thereof a plurality of teeth 35 forming a rack for moving the spindle 25 axially. A hole 77 drilled the length of spindle 25 communicates inlet pressure from chamber 17 to the recess 15' in end plug 15, so that cylinder 32 serves as a balancing piston to minimize the force required to move spindle 25.

As will appear more clearly from Fig. 5, the rack teeth 35 are engaged by an actuating pinion 46, which is formed on a spindle 36 having a reduced end portion 37 journaled in a transverse bore 38. Bushing 23 is provided at 23' with a cutaway portion to permit the insertion of pinion 46. Pinion 46 is located in a transverse bore 39 which communicates with an enlarged portion 40. Valve body 13 is provided with a mounting pad portion 41 surrounding the bore 40. To mounting pad 41 is secured, by suitable threaded fastenings 42, a combined stuffing box and spindle retainer member 43 having an end portion 44 projecting into bore 40 in a manner which will be apparent from Fig. 5. Spindle 36 is provided with a cylindrical flange 45 confined in bore 40 by the end portion 44 of the member 43. It will thus be apparent that cylindrical portion 45 serves as a thrust collar for spacing spindle 36 in a desired position axially so as to hold pinion 46 in proper relation with rack teeth 35. It will be apparent that any suitable gasket 47 may be interposed between member 43 and mounting pad 41.

As will also be seen in Fig. 5, the member 43 is provided with an enlarged bore forming a stuffing box containing suitable packing material 48, arranged to be compressed by a conventional threaded gland member 49. The end of spindle 36 projects through the stuffing box and gland and carries a first collar 50 provided with a pointer finger 51 arranged to engage a projection 52 on member 43 defining one limiting position of the actuating spindle 36. Also associated with the end of spindle 36 is a second collar 53 formed integral with an actuating lever 54 (Figs. 1–3). It will be understood that any suitable type of operating linkage will be associated with lever 54 (such as the link 55 shown in Fig. 1) so that spindle 36 will be caused to rotate through a limited arc in accordance with movements of the operator's throttle lever (not shown). In order to secure pointer 51 and operating lever 54 to the end of spindle 36, the respective collars 50 and 53 may be split at one side and provided with clamping set screws 56 and 57 in a manner which is well known to the art. To insure a positive connection for the members 50 and 53, the end of spindle 36 may be provided with serrations 58 which cooperate with corresponding serrations in members 50 and 53. A retaining screw 59 threaded axially into the end of shaft 36 may be provided to retain members 50 and 53 on the serrated end portion 58.

Referring again to Fig. 3, it will be seen that the left-hand end of spindle 25 is provided with an annular flange 60 against which is held a ring 61 of resilient material such as a suitable synthetic rubber. Ring 61 is held in position by a retainer member 62 threaded onto the reduced spindle end portion 63. The retainer 62 may be locked in position by means of a lockwire or cotter-pin projecting transversely through the threaded portion 63, in a manner well known to those skilled in the art.

The first bushing 19 is provided with an annular groove 64 in its outer circumference and one or more axially extending drilled holes 65 communicating between space 22 and annular groove 64. Formed in the valve body 13 adjacent bushing 19 is an axial groove 66 communicating between annular groove 64 and chamber 18. Chamber 18 communicates with the outlet conduit 12 by means of a passage (not shown) the arrangement of which will be obvious.

Projecting into the groove 66, for the purpose of varying the effective cross-section area thereof, is an axially adjustable pin 67 which is formed as a reduced end portion of a threaded spindle 68 having in the other end thereof a screwdriver slot 69. The spindle 68 is carried in the threaded bore of a gland member 70, which is in turn threaded into a boss 71 on the side of valve body 13. The member 70 may be locked in position relative to boss 71 by drilling a small hole and driving in a dowel pin 72. This is a well-known method for locking threaded parts, and obviously other suitable locking methods could be used. The inner end surface of member 70 is arranged to compress a packing 73 so as to prevent leakage through the respective threads of boss 71, member 70, and spindle 68. The exposed end of adjustable spindle 69 is covered by a cap 74 threaded onto member 70. A packing such as an aluminum washer 75 may be provided between boss 71 and cap 74.

Secured to or formed integral with the valve body 13 are suitable supporting feet 76 for mounting the valve.

The method of assembling the valve is as follows. Resilient packing ring 20 is stretched so as to pass over the outer circumference of bushing 19 and snap into its annular groove. The bushing 19 is inserted through the open left-hand end of the housing and pressed into place. The second bushing 23 may likewise be pressed into position through the open right-hand end of the housing. Resilient packing rings 61, 30 and 33 can be assembled, as shown in Fig. 3, by stretching them so as to pass over adjacent enlarged portions of the spindle and then letting them snap into position in their respective grooves. The retainer member 62 is assembled and secured by a cotter-pin or other suitable locking device. The complete spindle assembly may be inserted through the left-hand end of the housing; and end plugs 14 and 15 may then be inserted. The actuating spindle 36 may be assembled complete with member 43, packing 48, and gland 49, and then this complete sub-assembly attached to mounting pad 41 with pinion 46 projecting into bore 39 and engaging the rack teeth 35 in the manner indicated in Figs. 3 and 5. The pointer member 51 and actuating lever 54 are then assembled to the serrated spindle end portion 58 in proper relation to each other and to the housing, so that finger 51 will engage lug 52 to limit the opening movement of the valve and so that actuating lever 54 will be in a suitable position to be actuated properly by the control linkage 55. The method of assembly of the idling adjustment will be obvious from Figs. 3 and 4 taken in connection with the above description of the structure.

It will be seen from the above that the method of assembly is very simple, since the valve spindle assembly 25 and the actuating spindle assembly 36 may be put together separately as sub-assemblies, and then assembled into proper relation in the valve body. The arrangement of these sub-assemblies also facilitates maintenance and repair of the valve.

The method of operation of this valve when used to control the flow of fluid fuel in a gas turbine powerplant is as follows. It will be understood that inlet conduit 10 is connected to a suitable source of fuel, such as kerosene or gasoline under pressure. The particular means for providing the fuel is not material to an understanding of the present invention, but may be in accordance with application Serial No. 525,416, filed March 7, 1944 and since abandoned, in the name of Austin G. Silvester and assigned to the same assignee as the present application. As indicated above, fuel is discharged from the chamber 18 through conduit 12 to manifold 9.

The valve is shown in fully closed position in Fig. 3, with resilient ring 61 engaging the adjacent annular corner defined by bushing 19. This corner may of course be slightly beveled to prevent undue wear or cutting of ring 61. In this closed position, the fuel pressure acting on the left end of spindle 25 and member 62 will provide a certain unbalanced force tending to hold the valve in closed position, by reason of the fact that the area exposed to the fuel inlet pressure is somewhat greater than the area of the balancing piston 32, which is also exposed to inlet pressure by reason of the axial balancing port 77.

When it is desired to start the powerplant, the operator energizes a starter motor (not shown) which brings the air compressor in casing 1 up to a speed sufficient to supply air to the combustion chambers 6 needed to initiate combustion. At the same time the fuel supply system begins to supply fuel under pressure through conduit 10 to valve chamber 17. When the fuel pressure and engine speed are at the proper values, the operator moves control lever 54 in the opening direction, about 10 to 20 degrees of such movement being required to move resilient ring 61 out of engagement with bushing 19. Then fuel flows through the annular space defined between ring 61 and bushing 19 to the chamber 22, and through hole 65 to annular groove 64 and past the end of pin 67 through axial groove 66 to chamber 18 and thence to outlet 12 and manifold 9. It will be seen that the passages 65, 64, and 66 with adjustable pin 67 form a variable bypass around the contoured cylinder 26. This passage provides the minimum flow of fuel required to start the powerplant and operate it at idling speed. From the above description of the construction, it will be apparent that the idling speed can be readily adjusted by removing cap 74 and turning spindle 68 by inserting a screwdriver in slot 69.

If now control lever 54 is moved past the idling position, spindle 25 moves further to the left so that the portion of cylinder 26 containing the contours 27 defines with the left end of bore 21 metering orifices of variable effective area, which area progressively increases as the spindle moves to the left. The contours on the cylinder 26 are very carefully designed so as to produce a desired schedule of effective orifice area as a function of the position of control lever 54 and spindle 25. The precise shape of the contours 27 will of course depend on the requirements of the particular powerplant, the characteristics of the fuel supply system, etc.

It will now be apparent that during normal operation, i. e. at speeds above idling, the contoured cylinder 26 forms a variable metering device for controlling the flow of fuel to the powerplant in a predetermined manner. As the spindle 25 is moved to the right, the rate of fuel flow through the valve decreases until the left-hand end of cylinder 26 completely fills the bore 21 and the fuel flow is reduced to the idling amount bypassed through passages 65, 64 and 66. It will be obvious that the engagement of ring 61 with bushing 19 determines the "closed" position of control lever 54, while the full open position of the valve is determined by the engagement of finger 51 with projecting lug 52.

It will be appreciated that once the valve is assembled with the control lever 54 and pointer member 50 secured to spindle 36 in proper relation to each other, there is no further adjustment needed, except for setting the idling adjustment, which may be readily done by removing cap 74 without any further disassembly of the valve.

It will be seen that my invention provides a simple, lightweight control valve which is easily assembled, readily tested and adjusted, and readily disassembled for servicing. It combines the functions of a shut-off valve and a variable metering valve, and has only one operating device, which requires minimum operating torque by reason of the balanced pressure design.

What I claim as new and desire to secure by Letters Patent of the United States, is:

1. A fluid control valve having closed, minimum flow, and metering positions, comprising a substantially cylindrical body with an axial bore including axially spaced inlet and outlet chambers with a first reduced diameter bore portion communicating between said chambers and a second bore portion adjacent one of said chambers on the side remote from the other chamber, said body defining an annular valve seat at the juncture of the first bore portion with one of said chambers, an axially movable valve spindle arranged in said bore and having a disk portion arranged to engage said seat in the closed position and a first contoured portion arranged in the first bore portion and shaped so as to completely fill said bore portion in the closed and minimum flow positions and to cooperate with said seat to define a flow control orifice which varies as a function of spindle location in the metering positions, said body also defining a passage communicating with the outlet chamber and bypassing said first contoured spindle portion, said disk and first contoured portion being so constructed and arranged relative to the valve seat, first bore portion, and bypass passage that initial movement of the spindle from closed position to minimum flow position disengages the disk from the seat and permits fluid to flow from the inlet chamber through the bypass passage to the outlet chamber while further movement from minimum flow to metering position causes the first contoured portion to define a variable metering orifice with the seat, said spindle also having second and third cylindrical portions axially spaced from the first portion and slidably arranged in the second bore portion, the spindle being provided between said second and third cylindrical portions with rack teeth, and an actuating pinion engaging the rack teeth and carried on a shaft extending transversely of and journaled in said valve body.

2. A fluid control valve having closed, minimum flow, and metering positions, comprising a substantially cylindrical body with an axial bore including axially spaced inlet and outlet chambers with a first reduced diameter bore portion communicating between said chambers and a second bore portion adjacent one of said chambers on the side remote from the other chamber, said body defining an annular valve seat at the juncture of the first bore portion with one of said chambers, an axially movable valve spindle arranged in said bore and having a disk portion arranged to engage said seat in the closed position and a first contoured portion arranged in the first bore portion and shaped so as to completely fill said bore portion in the closed and minimum flow positions and to cooperate with said seat to define a flow control orifice which varies as a function of spindle location in the metering position, said body also defining a passage communicating with the outlet chamber and bypassing said first contoured spindle portion, said disk and first contoured portion being so constructed and arranged relative to the valve seat, first bore portion, and bypass passage that initial movement of the spindle from closed position to minimum flow position disengages the disk from the seat and permits fluid to flow from the inlet chamber through the bypass passage to the outlet chamber while further movement from minimum flow to metering position causes the first contoured portion to define a variable metering orifice with the seat, said spindle also having second and third cylindrical portions axially spaced from the first contoured portion and slidably arranged in the second bore portion, the spindle being provided between said second and third cylindrical portions with rack teeth, an actuating pinion engaging the rack teeth and carried on a shaft extending transversely of and journaled in said valve body, and adjustable means for varying the effective area of said bypass passage.

3. A fluid control valve having closed and metering positions, comprising a substantially cylindrical body defining an axial bore with one end closed and the other opening through an end surface of the body, said bore including axially spaced inlet and outlet chambers with a first reduced diameter bore portion communicating between said chambers and a second bore portion adjacent one of said chambers on the side remote from the other chamber, said body defining an annular valve seat at the juncture of the first bore portion with one of said chambers, a valve spindle assembly arranged to slide axially in said bore and including a disk portion arranged to engage said valve seat in the closed position, a first contoured portion arranged in the first bore portion and shaped so as to completely fill said bore portion in the closed position and to cooperate with said seat to define a flow control orifice which varies as a function of spindle location in the metering position, said spindle also having second and third cylindrical portions axially spaced from the first contoured portion and slidably arranged in the second bore portion, the valve spindle being provided between said second and third cylindrical portions with rack teeth, an actuating pinion engaging the rack teeth and carried on a shaft extending transversely of and journaled in said valve body, said body defining a transverse recess for receiving said actuating pinion and shaft, and an actuating spindle support member secured to said body and having an end portion projecting into said transverse recess, the valve spindle with its disk, first contoured portion and second and third cylindrical portions forming a complete sub-assembly insertable into said bore through the open end thereof, and the actuating pinion, spindle, and support member forming a second sub-assembly insertable through an open end of said transverse recess.

4. A fluid control valve having closed, minimum flow, and metering positions, comprising a substantially cylindrical body defining an axial bore with one end closed and the other opening through an end of the body, said bore including an inlet chamber adjacent said end and an outlet chamber intermediate the ends of the body, said bore also including a first reduced diameter bore portion communicating between said chambers and a second bore portion adjacent the outlet chamber on the side remote from the inlet chamber, said body defining an annular valve seat at the juncture of the first bore portion with the inlet chamber, a valve spindle assembly arranged to slide axially in said bore and including a disk portion arranged to engage said valve seat in the closed position, a first contoured portion arranged in the first bore portion axially spaced from said disk portion to define an annular space therebetween and shaped so as to completely fill said bore portion in the closed and minimum flow positions and to cooperate with said seat to define a flow control orifice which varies as a function of spindle location in the metering position, said body defining a passage around said first contoured portion and communicating between said annular space and the outlet chamber, said spindle also having a second cylindrical portion axially spaced from the first contoured portion and a third cylindrical portion axially spaced from the second portion and adjacent the end of the spindle remote from said disk portion, said second and third cylindrical portions being slidably arranged in said second bore portion, said valve spindle defining a pressure balancing port communicating between the inlet chamber and a balancing chamber defined by the end of said third cylindrical spindle portion and the adjacent closed end of said axial bore, the valve spindle being provided between said second and third cylindrical portions with rack teeth, an actuating pinion engaging the rack teeth and carried on a shaft extending transversely of and journaled in said valve body, said body defining a transverse recess for receiving said actuating pinion and shaft, and an actuating spindle support member secured to said body and having an end portion projecting into said transverse recess, the valve spindle with its disk, first contoured portion and second and third cylindrical portions forming a complete sub-assembly insertable into said bore through the open end thereof, and the actuating pinion, spindle, and support member forming a second sub-assembly insertable through the open end of said transverse recess.

5. A fluid control valve having closed, minimum flow, and metering positions, comprising a substantially cylindrical body defining an axial bore with one end closed and the other open through an end of the body, said bore including an inlet chamber adjacent said end and an outlet chamber intermediate the ends of the body, said bore also including a first reduced diameter bore portion communicating between said chambers and a second bore portion adjacent the outlet chamber on the side remote from the inlet chamber, said body defining an annular valve seat at the juncture of the first bore portion with the inlet chamber, a valve spindle assembly arranged to slide axially in said bore and including a disk portion arranged to engage said valve seat in the closed position, a first contoured portion arranged in the first bore portion axially spaced from said disk portion to define an annular space therebetween and shaped so as to completely fill said bore portion in the closed and minimum flow positions and to cooperate with said seat to define a flow control orifice which varies as a function of spindle location in the metering position, said body defining a bypass passage around said first contoured portion and communicating between said annular space and the outlet chamber, means adjustable from the exterior of the body for varying the effective area of the bypass passage, said spindle also having a second cylindrical portion axially spaced from the first contoured portion and a third cylindrical portion axially spaced from the second portion and adjacent the end of the spindle remote from said disk portion, said second and third cylindrical portions being slidably arranged in said second bore portion, said valve spindle defining a pressure balancing port communicating between the inlet chamber and a balancing chamber defined by the end of said third cylindrical portion and the adjacent closed end of said axial bore, the valve spindle being provided between said second and third cylindrical portions with rack teeth, an actuating pinion engaging the rack teeth and carried on a shaft extending transversely of and journaled in said valve body, said body defining a transverse recess for receiving said actuating pinion and shaft, and an actuating spindle support member secured to said housing and having an end portion projecting into said transverse recess, the valve spindle with its disk, first contoured portion and second and third cylindrical portions forming a complete sub-assembly insertable into said bore through the open end thereof, and the actuating pinion, spindle, and support member forming a second sub-assembly insertable through the open end of said transverse recess.

SAMUEL R. BARR.

REFERENCES CITED

The following references are of record in the file of this patent:

UNITED STATES PATENTS

| Number | Name | Date |
|---|---|---|
| 1,720,705 | Waterman | July 16, 1929 |
| 1,730,322 | Gartin | Oct. 1, 1929 |
| 2,273,605 | Wall | Feb. 17, 1942 |

Certificate of Correction

Patent No. 2,485,349 October 18, 1949

SAMUEL R. BARR

It is hereby certified that error appears in the printed specification of the above numbered patent requiring correction as follows:

Column 2, line 5, strike out the words "since abandoned" and insert instead *now Patent No. 2,479,573, issued August 23, 1949;* and that the said Letters Patent should be read with this correction therein that the same may conform to the record of the case in the Patent Office.

Signed and sealed this 28th day of March, A. D. 1950.

[SEAL]

THOMAS F. MURPHY,
*Assistant Commissioner of Patents.*